J. B. WIARD.
METHOD OF AND APPARATUS FOR CASTING.
APPLICATION FILED NOV. 13, 1919.

1,360,484.

Patented Nov. 30, 1920.
2 SHEETS—SHEET 1.

Inventor:
John B. Wiard,
by Emery Booth Janney & Varney
Attys.

J. B. WIARD.
METHOD OF AND APPARATUS FOR CASTING.
APPLICATION FILED NOV. 13, 1919.
1,360,484.
Patented Nov. 30, 1920.
2 SHEETS—SHEET 2.
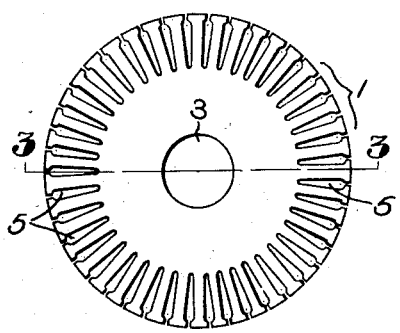
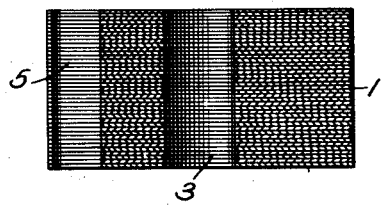
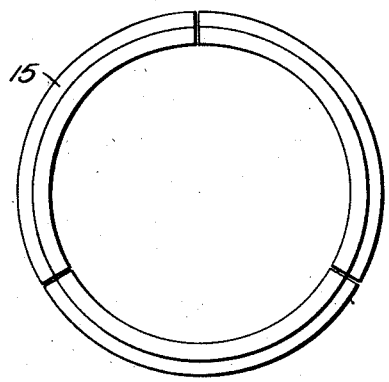
Inventor:
John B. Wiard,
by Emery Booth Janney Varney
Attys.

UNITED STATES PATENT OFFICE.

JOHN B. WIARD, OF LYNN, MASSACHUSETTS.

METHOD OF AND APPARATUS FOR CASTING.

1,360,484.　　　　　Specification of Letters Patent.　　Patented Nov. 30, 1920.

Application filed November 13, 1919. Serial No. 337,729.

*To all whom it may concern:*

Be it known that I, JOHN B. WIARD, a citizen of the United States, and a resident of Lynn, in the county of Essex and State of Massachusetts, have invented an Improvement in Method of and Apparatus for Casting, of which the following description, in connection with the accompanying drawings, is a specification, like characters on the drawings representing like parts.

This invention relates to methods of and apparatus for casting articles and more particularly, though not exclusively, to the casting of squirrel-cage windings for the armatures of induction motors.

This invention will be best understood by reference to the following description of one specific embodiment thereof and of one mode of carrying it into effect, when taken in connection with the accompanying drawings, while its scope will be more particularly pointed out in the appended claims.

In the drawings:—

Fig. 2 is an end view of a magnetic core for an induction motor, showing the slots or passages for receiving the longitudinal conductors of the squirrel-cage winding;

Fig. 3 is a section in elevation on line 3—3 in Fig. 2; and

Fig. 4 is a plan view of the end ring which is utilized to form a part of the mold.

Figure 1:
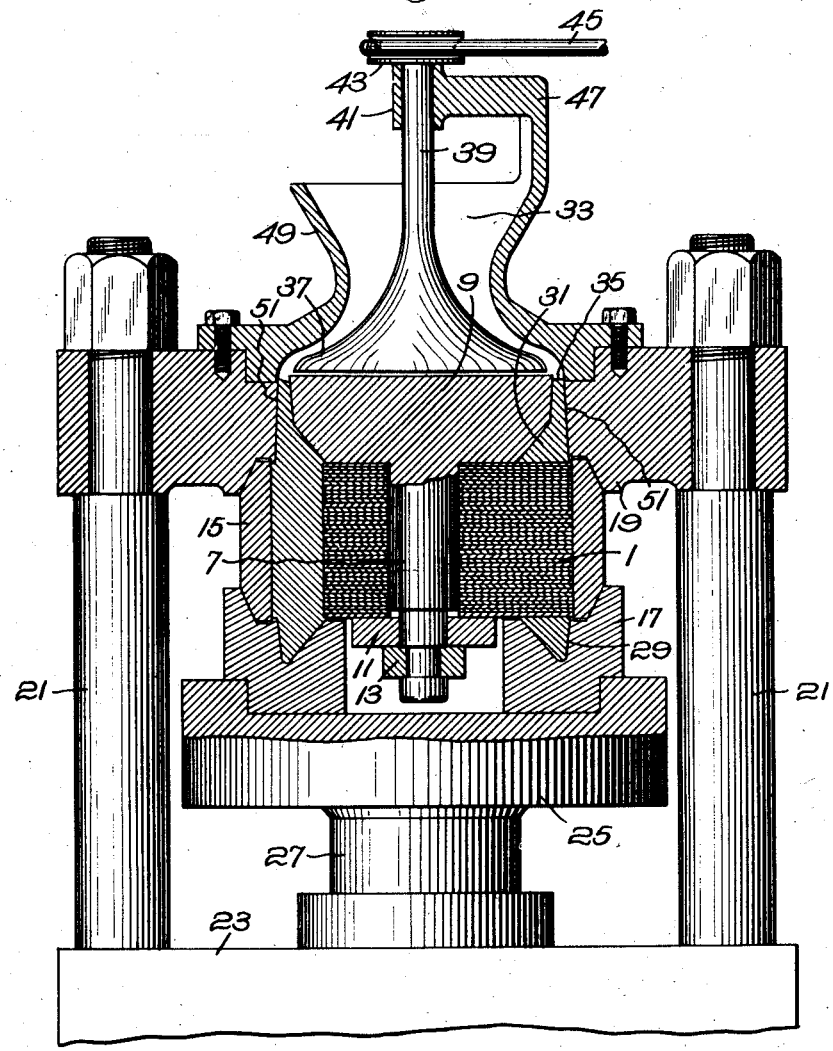
Figure 1 is a longitudinal elevation, partly in section, showing an apparatus embodying one form of the invention and by means of which the improved method may be carried out.

Referring to the drawings and to the embodiment of the invention there illustrated, a magnetic core member 1 for an induction motor is shown, the same being of usual construction, comprising an assemblage of laminated disks. These are centrally perforated to form an axial bore or passage 3 and are provided each at or near its periphery with a series of circumferentially distributed and equally spaced openings 5 (Figs. 2 and 3) which, when the disks are assembled, form a series of slots or passages extending longitudinally the core and adapted to receive the longitudinal conductors of the squirrel-cage winding. The openings 5 may be wholly within the edges of the disks to form surface-closed slots in the core, but herein open slots are provided, each opening 5 extending to the periphery of the disk.

In the illustrated embodiment of the invention, to form the squirrel-cage winding on the magnetic core, the laminated members are assembled on an arbor 7 and, while held under pressure, as for example in a suitable press, they are secured in fixed position by suitable means such as the head or plate 9 secured to or formed on one end of the arbor and a washer or plate 11, the latter securely held in position by the split horseshoe key 13 which is slipped over a circumferentially grooved or notched portion near the end of the arbor.

The core thus assembled is placed in a suitable mold but as a preparatory step in casting the armature the core is first preferably heated to as high a temperature as is consistent with its being handled and the mold itself is also preferably heated.

While the mold may be constructed in various forms and supported in any suitable way which is convenient for handling the core member and carrying out the casting operation, herein for simplicity and convenience it is formed of several parts which can be readily assembled with the core member in a suitable position for receiving the molten metal.

These parts herein include a cylindrical mold member or ring 15 which is preferably split longitudinally into a plurality of sections as illustrated in Fig. 4 where it is shown as composed of three segmental pieces. The ends of the split ring at each outer edge are herein beveled or otherwise suitably shaped and, when the mold is assembled as shown in Fig. 1, are adapted to seat against correspondingly beveled walls presented at one end by the base member 17 of the mold and at the opposite end by the head member 19 thereof. Preferably means are provided for moving the head and base members of the mold relatively toward and away from each other so as to permit the insertion and removal of the magnetic core and the split ring. For this purpose the head member 19 of the mold is herein mounted in fixed position upon the upright rods or pedestals 21 which are arranged at opposite sides of the mold and are fixedly secured to the underlying base 23. The base member 17 of the mold, however, is carried by the vertically movable head 25 which may be raised and lowered by any suitable means, as for example by the plunger 27 or any suitable or usual hydraulic ram or press. When the core member is assembled and ready to be inserted in the mold, the head 25 is lowered and the core member placed thereon with the lower, flat, end face resting on the flat upper surface of the base member 17, the latter being suitably recessed to receive the washer, split ring and end of the arbor 7 and the recess communicating with the end-ring space through one or more vent grooves shown in section in Fig. 1 on the upper surface of the base member. The end ring segments being placed in position around the periphery of the core member with their lower beveled edges seated in the beveled recess of the base member 17, the head 25 is elevated until the upper beveled edges of the split ring seat firmly in the beveled recess of the head member, this acting to clamp the ring segments closely about the periphery of the core, close the mold and locate the core concentrically with relation to the various parts of the mold. The dimensions of the split ring are such that a suitable contractive movement of the latter is permitted under this clamping action and the openings between the segments are preferably so arranged in assembling the mold that they do not come opposite the slot openings in the core.

The mold as assembled presents a ring-shaped space 29 in the base member 17 which communicates with the longitudinal openings in the magnetic core and is of any suitable size, shape and position which may be selected to form the desired shape of short-circuiting end ring at the lower end of the core member. A similar end-ring space is presented by the mold at the opposite or upper end thereof. This may be contained wholly within the head member 19 if desired but, herein, the plate 9 secured to the end of the arbor 7 is so fashioned at its peripheral edges as to present the end-ring-forming wall 31 which in coöperation with the opposite wall of the mold member 19 provides an end-ring-forming space generally similar to the ring-like space 29 contained in the base member 17.

To introduce molten metal into the mold, the metal-receiving space is connected to a suitable supply passage or passages at some appropriate point. In the illustrated embodiment of the invention, for that purpose, the upper end-ring-forming space is connected to a metal delivery chamber 33 through one or more passages or conduits. Such inlet passages may be provided at any suitable point but herein they are presented by an annular space 35 which is provided between the periphery of the plate 9 and the encircling walls of the upper mold member 19.

At some suitable point, and herein at the bottom of the supply chamber and directly above the plate 9, means are provided for distributing the molten metal to the mold-receiving spaces through the passage 35 and for delivering the metal under such force or pressure that the same will pass quickly and with certainty uniformly into the upper end-ring space and the connecting slots or passages in the magnetic core and into the lower end-ring space, so so to produce a homogeneous casting.

Any suitable means may be provided for this purpose, but herein such delivery and distribution of the metal is had by providing a rotary distributing device 37 in the form of a disk or plate-like member carried by the upright shaft or spindle 39 mounted in a journal bearing 41 and adapted to be rotated through any suitable means such as the driving pulley 43 connected to the driving belt 45. The journal bearing 41 is herein shown as supported by a bracket 47 which is formed by or secured to the walls of a suitably lined, funnel-shaped casing 49 within which the rotary distributer is contained, such casing being bolted to the top of the upper mold member 19.

When the core has been assembled in its mold, as described, and the metal is ready to pour, the rotary distributer 37 is rotated at a suitable speed through the driving belt 45. Preferably aluminum is employed but any other suitable metal, such as copper, may be used. The metal is then introduced into the funnel-shaped chamber and, passing through the supply or distributing space 33 in a more or less solid stream around the spindle, it flows downward over the curved deflecting surface of the distributer and is forced into the passages 35 at a relatively high velocity imparted by the centrifugal action of the distributer on the molten metal itself where it comes into frictional contact with the distributer surface. The velocity with which the metal is thrown out radially and forced down into the passages and slot openings may be governed to some extent by the speed of rotation imparted to the disk and may also be varied by the employment of conduits, deflecting walls, passages or spout-like contrivances carried by the disk itself, all of which are within the scope of the invention. The specific form of distributer shown, however, is provided with a smooth surface formed of or covered with any substance capable of resisting the action of the molten metal and has a cross-section the area of which diminishes from the bottom upward. In coöperation with the suitably shaped walls of the surrounding funnel 49, an annular passage is formed adapted to give a substantially constant velocity of discharge to the molten metal. Preferably, though not necessarily, the cross-sectional area of this annular passage is no greater at the edge of the disk than for some substantial distance upward, the specific design herein providing for a passage of substantially the same cross-section from a point where the metal begins to acquire a substantial velocity to a point adjacent the edge of the disk. This form of distributer tends to deliver the metal into the end-ring space in the form of a circumferentially uniform and smooth stream resembling a hollow cylinder with little tendency to oxidize. The described form of the invention is not only capable of forcing the molten metal into the large number of small interconnecting passages of the mold under a suitably high pressure or force induced by the centrifugal action of the distributer, but the metal so introduced is distributed uniformly into the circumferential series of passages since it is discharged from the distributing device in a circumferential path immediately over the end-ring-forming spaces of the mold. All slots are therefore not only filled quickly but are filled uniformly and at substantially the same rate.

In casting articles of this kind, it is highly desirable to fill all the longitudinal passages or rotor slots at substantially the same time and to flow the metal completely through the slots from one end to the other. The described method and apparatus for introducing the molten metal into a mold of this description permits the use of a stationary mold, thereby greatly simplifying the process, while at the same time it provides a method of filling the various interconnected passages and molds symmetrically and uniformly, so that the metal flows completely through the slots from the upper end-ring space to the lower end-ring space before filling the latter, avoiding the possibility of air pockets and other faults and producing a sound, homogeneous casting.

The pouring of the metal is continued until the slots and the upper end-ring space become filled and a slight excess of metal is allowed to accumulate at 51. When the casting is cooled and the pressure on the hydraulic ram removed, the mold will open and the core with its cast winding may be removed. The upper end ring may be then finished by cutting off the excess metal 51 so that the ring will have substantially the same section as is presented by the ring at the opposite end of the core. The finished core may be subjected to any usual or desired operations to utilize it in the motor, such for example as reaming the bore 3, fitting it with a shaft which is keyed thereto, and turning or guiding the core to the required outside diameter.

It will be observed that the base member 17 of the mold and the clamping plate 9 thereof present to the metal walls which are adapted to form the inside face of the two end rings. In order to prevent the shrinkage of the end rings as the casting cools from causing the ring to grip the mold members along the inner face of the ring and from developing shrinkage cracks, the walls presented by the end-ring-forming members are preferably so shaped, as by beveling or inclining them, that the inner face of the end ring has a greater diameter at its outer end than at its inner end. This shape of the inner face of the end ring may be such as to bring about a condition whereby shrinkage of the end ring radially inward is compensated or partly compensated by the shrinkage of the casting lengthwise the conductors so that the net shrinkage at the inner face of the end ring tends to lie along a direction approximating the face of the mold which is presented to the inner face, thus preventing the end ring from shrinking in about the mold and preventing shrinkage cracks. If desired, the radially inward shrinkage of the end ring may be compensated for by permitting an endwise movement of the mold member which contacts with the inner face of the ring, as for example by permitting an endwise or longitudinal movement of the plate 9 with relation to the arbor 7, so that as the ring contracts in cooling the core or mold at the inside of the ring may be forced vertically upward to compensate therefor.

While I have herein shown and described for the purposes of illustration one specific embodiment of the invention and described in detail the procedure by which one form of the process may be carried into effect, it is to be understood that the invention is not limited to the specific features herein described nor to the mechanical construction, details or form or relative arrangement of parts therein involved, but that extensive deviations therefrom may be made without departing from the spirit of the invention.

Claims.

1. In a casting apparatus for forming conductors and short-circuiting end rings in the magnetic core member of an induction motor presenting substantially longitudinally extending, conductor-receiving openings therethrough, a mold adapted to receive said core member and presenting end-ring-forming spaces communicating with the openings in said core member, means to hold said mold stationary in an upright position, said apparatus having a delivery chamber for the molten metal communicating with the upper end space and a centrifugal distributing device therein for forcing molten metal into the end-ring spaces and distributing it uniformly to the communicating, conductor-receiving openings.

2. In a casting apparatus for forming conductors and short-circuiting end rings in the magnetic core member of an induction motor presenting substantially longitudinally extending, conductor-receiving openings therethrough, a stationary mold adapted to receive said core member and presenting end-ring-forming spaces communicating with the openings therein and means for forcing molten metal into the end-ring spaces and the communicating, conductor-receiving openings.

3. In a casting apparatus for forming conductors and short-circuiting end rings in the magnetic core member of an induction motor presenting substantially longitudinally extending, conductor-receiving openings therethrough, a stationary mold adapted to receive said core member and presenting end-ring-forming spaces communicating with the openings therein, and means for distributing molten metal under centrifugal force to the end-ring spaces and the communicating, conductor-receiving openings.

4. In a casting apparatus for forming conductors and short-circuiting end rings in the magnetic core member of an induction motor presenting substantially longitudinally extending, conductor-receiving openings therethrough, a mold adapted to receive said core member and presenting annular end-ring-forming spaces communicating at circumferentially separated points with the openings in said core member, and centrifugal delivery means movable independently of the mold to deliver molten metal thereto.

5. In a casting apparatus for forming conductors and short-circuiting end rings in the magnetic core member of an induction motor presenting substantially longitudinally extending, conductor-receiving openings therethrough, a mold adapted to receive said core member and presenting end-ring-forming spaces communicating with the openings in said core member, and centrifugal delivery means coöperating with the mold to deliver molten metal thereto.

6. In a casting apparatus for forming conductors and short-circuiting end rings in the magnetic core member of an induction motor presenting substantially longitudinally extending, conductor-receiving openings therethrough, a mold adapted to receive said core member and presenting end-ring-forming spaces communicating with the openings in said core member and presenting also a chamber at one end communicating with an end-ring space, a rotary distributer working in said chamber and adapted to receive molten metal and distribute it from its periphery to the end-ring space.

7. In a casting apparatus for forming conductors and short-circuiting end rings in the magnetic core member of an induction motor presenting substantially longitudinally extending, conductor-receiving openings therethrough, a mold adapted to receive said core member and presenting end-ring-forming spaces communicating with the openings in said core member and presenting a chamber at one end of the mold communicating with an end-ring space and a rotary distributer therein presenting a distributing surface sloping downward and outward toward its periphery.

8. In a casting apparatus for forming conductors and short-circuiting end rings in the magnetic core member of an induction motor presenting substantially longitudinally extending, conductor-receiving openings therethrough, a mold adapted to receive said core member and presenting end-ring-forming spaces communicating with the openings in said core member, a chamber at one end of the mold communicating with an end-ring space and a circular distributer to deliver molten metal from said chamber uniformly around said end-ring space.

9. In a casting apparatus for forming conductors and short-circuiting end rings in the magnetic core member of an induction motor presenting substantially longitudinally extending, conductor-receiving openings therethrough, a mold adapted to receive said core member and presenting end-ring-forming spaces communicating with the openings in said core member and means for delivering molten metal to an end-ring space in the form of a uniform sheet.

10. A casting apparatus including a mold having a plurality of interconnected passages, said apparatus having also a distributing chamber and a distributing device for distributing molten metal by centrifugal action to said passages.

11. A casting apparatus including a stationary mold having a plurality of interconnected passages, said apparatus having a distributing chamber and centrifugal distributing means therein for distributing molten metal by centrifugal action to said passages.

12. A casting apparatus including a mold having a plurality of interconnected passages, said apparatus having centrifugal delivery means to forcibly deliver molten metal to said passages.

13. A casting apparatus including a stationary mold having a plurality of longitudinal passages arranged circumferentially and having a delivery space communicating with said passages and a rotary distributer arranged in said delivery space.

14. The process of casting a squirrel-cage winding on a magnetic core of an induction motor having substantially longitudinally extending, conductor-receiving openings therethrough which consists in holding the core stationary in a suitable mold and forcing molten metal into the conductor-receiving openings by centrifugal force.

15. The process of casting a squirrel-cage winding on a magnetic core of an induction motor having substantially longitudinally extending, conductor-receiving openings therethrough which consists in holding the core stationary in a suitable mold and forcing molten metal into the conductor-receiving openings.

16. The process of casting a squirrel-cage winding on a magnetic core of an induction motor having substantially longitudinally extending, conductor-receiving openings therethrough which consists in mounting the core in a suitable mold and distributing molten metal to the openings by centrifugal action independent of the mold.

17. The process of casting a squirrel-cage winding on a magnetic core of an induction motor having substantially longitudinally extending, conductor-receiving openings therethrough which consists in mounting the core in a suitable mold and distributing molten metal to the openings by centrifugal action independent of the core.

18. The process of casting a squirrel-cage winding on a magnetic core of an induction motor having substantially longitudinal, conductor-receiving passages therethrough arranged circumferentially the core which consists in holding the mold stationary and in uniformly, forcibly and simultaneously delivering molten metal to said conductor-receiving openings.

19. The process of casting an article in a mold having a plurality of interconnected passages which consists in holding the mold stationary and distributing molten metal to said passages uniformly and simultaneously by centrifugal action.

20. The process of casting an article in a mold having a plurality of interconnected passages which consists in holding the mold stationary and distributing molten metal to said passages by centrifugal action.

21. A mold for forming the conductors and end rings of a squirrel-cage armature for an induction motor, said mold presenting an end-ring-forming space having inclined walls to form the inside face of the end ring.

22. A mold for forming the conductors and end rings of a squirrel-cage armature for an induction motor, said mold presenting an end-ring-forming space having walls providing for shrinkage of the casting lengthwise the core to offset or partly offset shrinkage of the end rings radially inward.

23. The process of casting a squirrel-cage winding on the magnetic core of an induction motor which consists in presenting an end-ring-forming wall to the inner face of an end ring and preventing the casting in cooling from shrinking thereagainst by causing the shrinkage of the casting lengthwise the conductor to offset or partly offset the effect of the shrinkage of the ring radially inward.

24. A mold for forming the conductors and end rings in a magnetic core member of an induction motor presenting an end-ring-forming space having means to offset the radially inward shrinkage of the end ring.

25. The process of casting an article in a mold having a plurality of interconnected passages which consists in holding the mold stationary, delivering the molten metal to a stationary receptacle and distributing the same to said passages in the mold by centrifugal action set up within the stationary receptacle.

26. A casting apparatus having stationary mold with a plurality of longitudinal passages circumferentially arranged, a stationary receptacle providing a delivery space communicating with said passages and a rotary distributer arranged within said receptacle.

27. A mold for forming a squirrel-cage winding on the magnetic core of an induction motor having a split ring for embracing the core member and end mold members relatively movable and adapted to engage said ring member at its ends to exert a clamping action on the core member.

28. A mold for forming squirrel-cage windings on the magnetic core member of an induction motor, said mold being adapted to receive the core member and including a mold member adapted to form the outer face of an end ring and a coöperating member to form the inner face thereof, the latter being adapted to be clamped to the end of the core member when the latter is assembled and to provide a metal-distributing space between the two mold members.

In testimony whereof, I have signed my name to this specification.

JOHN B. WIARD.